US012593820B2

(12) United States Patent (10) Patent No.: US 12,593,820 B2

Biffert et al. (45) Date of Patent: Apr. 7, 2026

(54) LIVESTOCK MANAGEMENT SYSTEM

(71) Applicant: 701x Inc., Fargo, ND (US)

(72) Inventors: Kevin N. Biffert, Horace, ND (US);
Maximillion K. Cossette, Fargo, ND
(US); Steven J. Berlinger, Dilworth,
MN (US); Peter S. Crowley, Fargo,
ND (US); Cole L. Mehring, Fargo, ND
(US); Keith D. Alsleben, Fargo, ND
(US); Braydon W. Love, Fergus Falls,
MN (US)

(73) Assignee: 701x Inc., Fargo, ND (US)

( * ) Notice: Subject to any disclaimer, the term of this
patent is extended or adjusted under 35
U.S.C. 154(b) by 146 days.

(21) Appl. No.: 18/416,229

(22) Filed: Jan. 18, 2024

(65) Prior Publication Data

US 2025/0234838 A1     Jul. 24, 2025

(51) Int. Cl.
*A01K 11/00* (2006.01)
*A01K 29/00* (2006.01)

(52) U.S. Cl.
CPC .......... *A01K 11/004* (2013.01); *A01K 11/008*
(2013.01); *A01K 29/005* (2013.01)

(58) Field of Classification Search
CPC ............................ A01K 11/004; A01K 11/008
USPC .......................................................... 40/301
See application file for complete search history.

(56) References Cited

U.S. PATENT DOCUMENTS

| | | | |
|---|---|---|---|
| 4,461,241 | A | 7/1984 | Ostler |
| 4,503,808 | A | 3/1985 | McAlister |
| 4,512,096 | A | 4/1985 | Heidecker |
| 4,878,302 | A * | 11/1989 | Jowsey ................ A01K 11/001 |
| | | | 40/302 |
| 5,711,246 | A | 1/1998 | Yano |
| 5,791,294 | A | 8/1998 | Manning |

(Continued)

FOREIGN PATENT DOCUMENTS

| | | |
|---|---|---|
| AU | 2017239570 A1 | 4/2018 |
| AU | 2021102218 A4 | 6/2021 |

(Continued)

OTHER PUBLICATIONS

Notice of Allowance Document Received for U.S. Appl. No.
18/162,885; Received May 8, 2024.

(Continued)

*Primary Examiner* — Kyle R Grabowski
(74) *Attorney, Agent, or Firm* — Neustel Law Offices

(57) ABSTRACT

Foldable or flexible ear tags for animals are disclosed herein.
An example ear tag includes a flexible member configured
to adapt to an interior of an ear of an animal, a solar panel
housed on a protruding segment of the flexible member, the
solar panel is configured to maintain an upward-facing
orientation for sunlight exposure when the electronic ear tag
is attached to the ear, an electronics assembly mounted on a
rigid member of the electronic ear tag, the electronics
assembly having a controller having a processor and
memory for receiving and processing data from a location
sensor, and a biometric sensor that are in contact with the
ear, and a strap extending from the flexible member, the
strap being configured to fit over a top of the ear to prevent
rotation of the electronic ear tag when a securement member
is inserted through the strap, the ear, and the flexible
member.

10 Claims, 9 Drawing Sheets

(56) References Cited

U.S. PATENT DOCUMENTS

| | | |
|---|---|---|
| 5,794,569 A | 8/1998 | Titus |
| 5,857,433 A | 1/1999 | Files |
| 6,067,018 A | 5/2000 | Skelton |
| 6,111,508 A | 8/2000 | Ensor |
| 6,243,039 B1 | 6/2001 | Elliot |
| 6,375,612 B1 | 4/2002 | Guichon |
| 6,507,771 B2 | 1/2003 | Payton |
| 6,510,380 B1 | 1/2003 | Curatolo |
| 6,512,478 B1 | 1/2003 | Chien |
| 6,674,368 B2 | 1/2004 | Hawkins |
| 6,720,879 B2 | 4/2004 | Edwards |
| 6,788,199 B2 | 9/2004 | Crabtree |
| 6,805,078 B2 | 10/2004 | Zimmerman |
| 6,868,804 B1 | 3/2005 | Huisma |
| 6,997,140 B2 | 2/2006 | Finlayson |
| 6,998,980 B2 | 2/2006 | Ingley, III |
| 6,998,985 B2 | 2/2006 | Reisman |
| 7,059,275 B2 | 6/2006 | Laitinen |
| 7,164,986 B2 | 1/2007 | Humphries |
| 7,218,229 B2 | 5/2007 | Boyd |
| 7,234,421 B2 | 6/2007 | Natividade |
| 7,248,167 B2 | 7/2007 | Wassingbo |
| 7,335,168 B2 | 2/2008 | Rugg |
| 7,411,492 B2 | 8/2008 | Greenberg |
| 7,467,603 B2 | 12/2008 | Davies |
| 7,525,425 B2 | 4/2009 | Diem |
| 7,616,124 B2 | 11/2009 | Paessel |
| 7,728,724 B1 | 6/2010 | Scalisi |
| 7,830,257 B2 | 11/2010 | Hassell |
| 7,904,244 B2 | 3/2011 | Sugla |
| 7,918,185 B2 | 4/2011 | Araki |
| 8,018,329 B2 | 9/2011 | Morgan |
| 8,125,332 B2 | 2/2012 | Curran |
| 8,149,125 B2 | 4/2012 | Geissler |
| 8,285,245 B2 | 10/2012 | Ashley, Jr. |
| 8,312,845 B2 | 11/2012 | Guinta |
| 8,340,022 B2 | 12/2012 | Lee |
| 8,849,926 B2 | 9/2014 | Marzencki |
| 8,890,677 B2 | 11/2014 | Raphaeli |
| 8,979,757 B2 | 3/2015 | Mottram |
| 8,983,426 B2 | 3/2015 | Cermak |
| 9,038,293 B2 | 5/2015 | Decaluwe |
| 9,044,297 B2 | 6/2015 | Rajkondawar |
| 9,370,170 B2 | 6/2016 | Downing |
| 9,448,072 B2 | 9/2016 | Bandyopadhyay |
| 9,449,202 B2 | 9/2016 | Clare |
| 9,489,813 B1 | 11/2016 | Beigel |
| 9,504,387 B2 | 11/2016 | Lanza |
| 9,848,577 B1 | 12/2017 | Brandao |
| 9,936,676 B1 | 4/2018 | Ulmer |
| 9,980,467 B2 | 5/2018 | Auer |
| 10,075,813 B1 | 9/2018 | Struhsaker |
| 10,242,547 B1 | 3/2019 | Struhsaker |
| 10,292,370 B2 | 5/2019 | Mobley |
| 10,383,312 B2 * | 8/2019 | Steinfort ................... G09F 3/02 |
| 10,660,546 B2 | 5/2020 | Saigh |
| 10,697,947 B1 | 6/2020 | Armitage |
| 11,232,393 B1 | 1/2022 | Kim |
| 11,324,197 B2 | 5/2022 | Smith |
| 11,503,802 B2 | 11/2022 | Jones |
| D990,792 S | 6/2023 | Smith |
| 12,029,197 B1 | 7/2024 | Biffert |
| 2002/0046713 A1 | 4/2002 | Otto |
| 2002/0050248 A1 | 5/2002 | Pratt |
| 2004/0074448 A1 | 4/2004 | Bunt |
| 2004/0078390 A1 | 4/2004 | Saunders |
| 2005/0006153 A1 | 1/2005 | Baarsch |
| 2005/0162279 A1 | 7/2005 | Marshall |
| 2006/0097882 A1 | 5/2006 | Brinkerhoff |
| 2006/0161443 A1 | 7/2006 | Rollins |
| 2006/0201432 A1 | 9/2006 | Pratt |
| 2006/0267731 A1 | 11/2006 | Chen |
| 2007/0012260 A1 | 1/2007 | Boyd |
| 2007/0171048 A1 | 7/2007 | Shapiro |
| 2007/0209594 A1 | 9/2007 | Kaever |

| | | |
|---|---|---|
| 2007/0229350 A1 | 10/2007 | Scalisi |
| 2008/0147458 A1 | 6/2008 | Yamazaki |
| 2010/0030036 A1 | 2/2010 | Mottram |
| 2010/0127853 A1 | 5/2010 | Hanson |
| 2010/0156606 A1 | 6/2010 | Gold |
| 2011/0102154 A1 | 5/2011 | Hindhede |
| 2011/0125062 A1 | 5/2011 | Mulder |
| 2011/0125065 A1 | 5/2011 | Voronin |
| 2011/0148639 A1 | 6/2011 | Geissler |
| 2011/0192356 A1 | 8/2011 | Loosveld |
| 2012/0050046 A1 | 3/2012 | Satorius |
| 2012/0065483 A1 | 3/2012 | Chung |
| 2012/0294876 A1 | 11/2012 | Zimmerman |
| 2013/0175347 A1 | 7/2013 | Decaluwe |
| 2013/0340305 A1 | 12/2013 | Mobley |
| 2014/0237595 A1 | 8/2014 | Sridhara |
| 2015/0039239 A1 | 2/2015 | Shuler |
| 2015/0097668 A1 | 4/2015 | Toth |
| 2015/0282457 A1 | 10/2015 | Yarden |
| 2015/0373951 A1 | 12/2015 | Kelly |
| 2016/0143719 A1 | 5/2016 | Folkers |
| 2017/0156288 A1 | 6/2017 | Singh |
| 2017/0196203 A1 | 7/2017 | Huisma |
| 2018/0048987 A1 | 2/2018 | Morris |
| 2018/0054399 A1 | 2/2018 | Shinoda |
| 2018/0146645 A1 | 5/2018 | Arbel |
| 2018/0160649 A1 | 6/2018 | Hicks |
| 2018/0249679 A1 * | 9/2018 | Candy ................. A01K 11/004 |
| 2018/0279582 A1 | 10/2018 | Yajima |
| 2018/0295809 A1 | 10/2018 | Yajima |
| 2018/0374165 A1 | 12/2018 | Ferro dos Santos |
| 2019/0008117 A1 | 1/2019 | Dijkstra |
| 2019/0008124 A1 | 1/2019 | Komatsu |
| 2019/0141959 A1 | 5/2019 | Ingham |
| 2019/0220844 A1 | 7/2019 | Trivelpiece |
| 2019/0223408 A1 | 7/2019 | Brayer |
| 2019/0254601 A1 | 8/2019 | Blackmore |
| 2019/0380311 A1 | 12/2019 | Crouthamel |
| 2020/0022338 A1 | 1/2020 | Rovnyi |
| 2020/0029534 A1 | 1/2020 | Austin |
| 2020/0085005 A1 | 3/2020 | Yoo |
| 2020/0107522 A1 | 4/2020 | Kersey |
| 2020/0125849 A1 | 4/2020 | Labrecque |
| 2020/0159720 A1 | 5/2020 | Leong |
| 2020/0160009 A1 | 5/2020 | Vatn |
| 2020/0323170 A1 | 10/2020 | Garigan |
| 2020/0359605 A1 | 11/2020 | Maher |
| 2020/0367471 A1 | 11/2020 | Deliou |
| 2021/0148881 A1 | 5/2021 | Deng |
| 2021/0185979 A1 * | 6/2021 | Jones ................... A01K 11/004 |
| 2022/0104929 A1 | 4/2022 | Cummins |
| 2022/0192150 A1 | 6/2022 | Biffert |
| 2022/0192151 A1 | 6/2022 | Biffert |
| 2022/0192152 A1 | 6/2022 | Biffert |
| 2022/0200519 A1 | 6/2022 | Biffert |
| 2022/0386564 A1 | 12/2022 | Smith |

FOREIGN PATENT DOCUMENTS

| | | | |
|---|---|---|---|
| CN | 101221231 A | 7/2008 | |
| CN | 205302353 U * | 6/2016 | ............. G09F 3/208 |
| CN | 208271218 U * | 12/2018 | ............. G09F 3/208 |
| CN | 115104546 A * | 9/2022 | ........... A01K 11/004 |
| CN | 118765814 A * | 10/2024 | ........... A01K 29/005 |
| EP | 0472763 A1 * | 3/1992 | ........... A01K 11/001 |
| EP | 3153095 A1 | 4/2017 | |
| EP | 3188648 B1 | 1/2020 | |
| FR | 2801491 A1 | 6/2001 | |
| GB | 2387465 A | 10/2003 | |
| WO | 2000011939 A2 | 3/2000 | |
| WO | 2005034617 A1 | 4/2005 | |
| WO | WO-2019040721 A2 * | 2/2019 | ........... A01K 11/008 |
| WO | 2019218012 A1 | 11/2019 | |
| WO | 2019241831 A1 | 12/2019 | |
| WO | 2019245978 A1 | 12/2019 | |
| WO | 2020031050 A1 | 2/2020 | |
| WO | 2020120516 A1 | 6/2020 | |
| WO | 2021000016 A1 | 7/2021 | |
| WO | 2021203166 A1 | 10/2021 | |

(56) References Cited

FOREIGN PATENT DOCUMENTS

| WO | 2021255731 A1 | 12/2021 | |
| WO | 2022005288 A1 | 1/2022 | |
| WO | 2022145792 A1 | 7/2022 | |
| WO | 2022178572 A1 | 9/2022 | |
| WO | 2022226596 A1 | 11/2022 | |
| WO | 2023159272 A1 | 8/2023 | |
| WO | WO-2023235930 A1 * | 12/2023 | ............ G09F 3/208 |

OTHER PUBLICATIONS

Atmel 8-Bit AVR Microcontroller with 2/4/8K Byes In-System Programmable Flash Datasheet; 2013. (Year: 2013).
Non-Final Office Action Document Received for U.S. Appl. No. 17/557,559; Received Dec. 22, 2023.
EPO Search Report and Opinion for Publication No. EP4266876; Oct. 8, 2024.
PCT Search Report and Opinion for PCT/US2024/029580; Sep. 17, 2024.
PCT International Search Report and Written Opinion for PCT/US2023/086390; Apr. 19, 2024.
Non-Final Office Action Document Received for U.S. Appl. No. 18/330,659; Received Oct. 10, 2024.
https://www.gammon.com.au/power; "Power Saving Techniques for Microprocessors" Gammon Forum Webpage; Jan. 13, 2012.
PCT International Search Report and Written Opinion for PCT/US2023/086378; Apr. 11, 2024.
https://cerestag.com/products/ceres-trace-pfi; Ceres Tag Webpage "Ceres Trace Pasture Feed Intake" and Screenshots Thereof; Nov. 3, 2023.
http://www.precisionanimalsolutions.com/how-it-works-.html; Precision Animal Solutions REDI Website; Mar. 14, 2023.
http://www.sensehubbeef.com/; Allflex Livestock Intelligence "SenseHub Beef" Webpage; Received Sep. 3, 2020.
http://www.sensehubbeef.com/documents/pdf/SenseHubBeef.pdf; Allflex Livestock Intelligence "SenseHub Beef" Cow Monitoring Brochure; Copyright 2018.
https://www.cerestag.com/; Ceres Tag Website; Received Sep. 3, 2020.
https://web.archive.org/web/20200806065228/https://www.cerestag.com/benefits/; Internet Archive Wayback Machine Archive.org "Ceres Tag Benefits" Webpage; Aug. 6, 2020.
https://www.moovement.com.au/gps-ear-tags; mOOvement "GPS Ear Tag" Website; Received Sep. 3, 2020.
https://ieeexplore.ieee.org/document/1280774; IEEE Xplore Webpage Article "Wearable Sensor System for Wireless State-of-Health Determination in Cattle"; L. Nagl; Sep. 17, 2003.
https://www.mdpi.com/1424-8220/9/5/3586/htm; MDPI Webpage Article "Monitoring Animal Behaviour and Environmental Interactions Using Wireless Sensor Networks, GPS Collars and Satellite Remote Sensing"; Rebecca N. Handcock; Published May 13, 2009.
https://www.mdpi.com/1424-8220/9/5/3942/pdf; MDPI.com Webpage Article "A Heterogeneous Wireless Identification Network for the Localization of Animals based on Stochastic Movements"; Alvaro Gutierrez; May 25, 2009.
http://www.diva-portal.org/smash/get/diva2:21508/FULLTEXT01.pdf; Diva Article "Sensor Systems for Positioning and Identification in Ubiquitous Computing"; Suri Jayabharath Kumar; Feb. 13, 2006.
https://www.beefcentral.com/ag-tech/gps-enabled-livestock-monitoring-tags-reach-the-commercial-market/; GPS-enabled livestock monitoring tags reach the commercial market; Beef Central; Mar. 17, 2020.
https://journalajarr.com/index.php/AJARR/article/view/13035/23855; "Design and Implementation of a Cattle Grazing Tracking and Anti-theft Alert GPS/GSM Collar, Leveraging on Improvement in Telecom and ICT Infrastructure", Asian Journal of Advanced Research and Reports, May 25, 2018.
PCT International Search Report and Opinion for PCT/US2021/064611; Apr. 27, 2022.
https://www.herddogg.com/products/; HerdDogg Product Webpage; Printed Jul. 28, 2022.
Non-Final Office Action Document Received for U.S. Appl. No. 18/302,351; Received Oct. 22, 2024.
Non-Final Office Action Document Received for U.S. Appl. No. 18/303,730; Received Jan. 3, 2025.

* cited by examiner

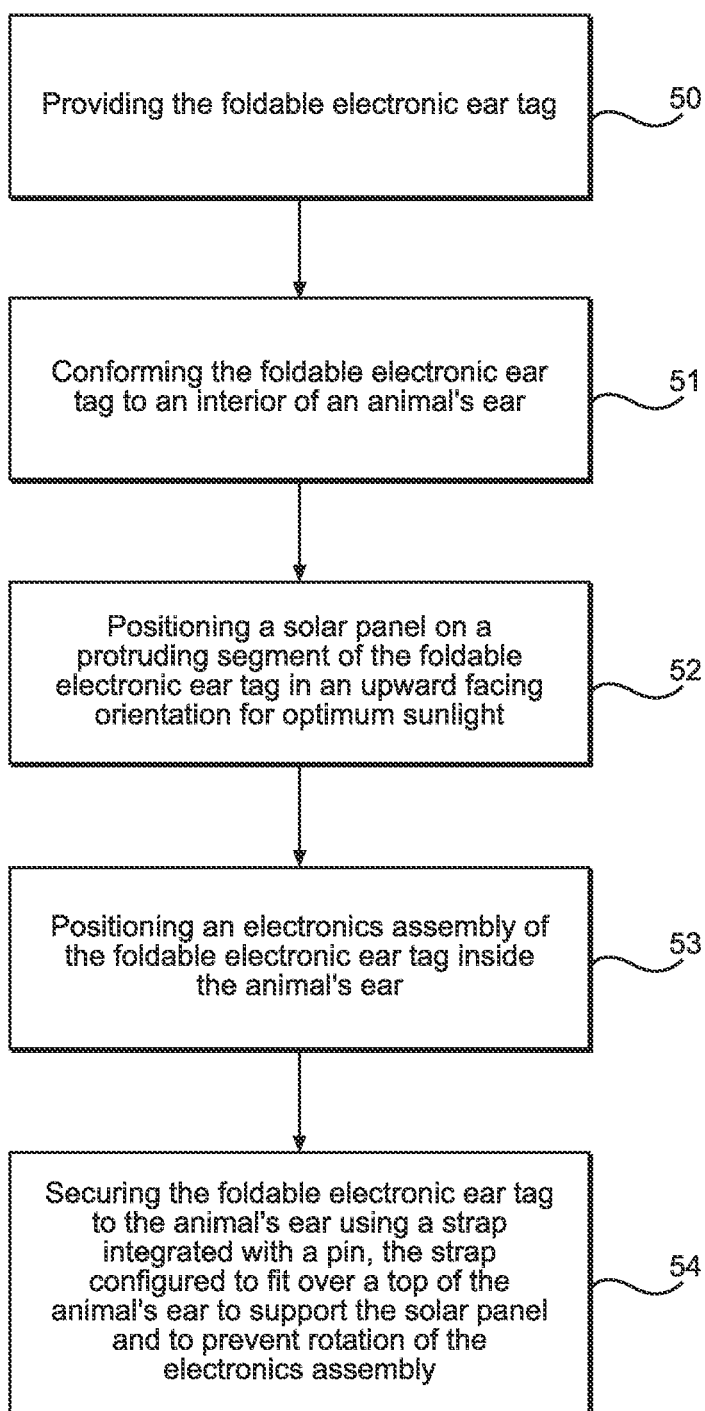

Providing the foldable electronic ear tag — 50

Conforming the foldable electronic ear tag to an interior of an animal's ear — 51

Positioning a solar panel on a protruding segment of the foldable electronic ear tag in an upward facing orientation for optimum sunlight — 52

Positioning an electronics assembly of the foldable electronic ear tag inside the animal's ear — 53

Securing the foldable electronic ear tag to the animal's ear using a strap integrated with a pin, the strap configured to fit over a top of the animal's ear to support the solar panel and to prevent rotation of the electronics assembly — 54

FIG. 5

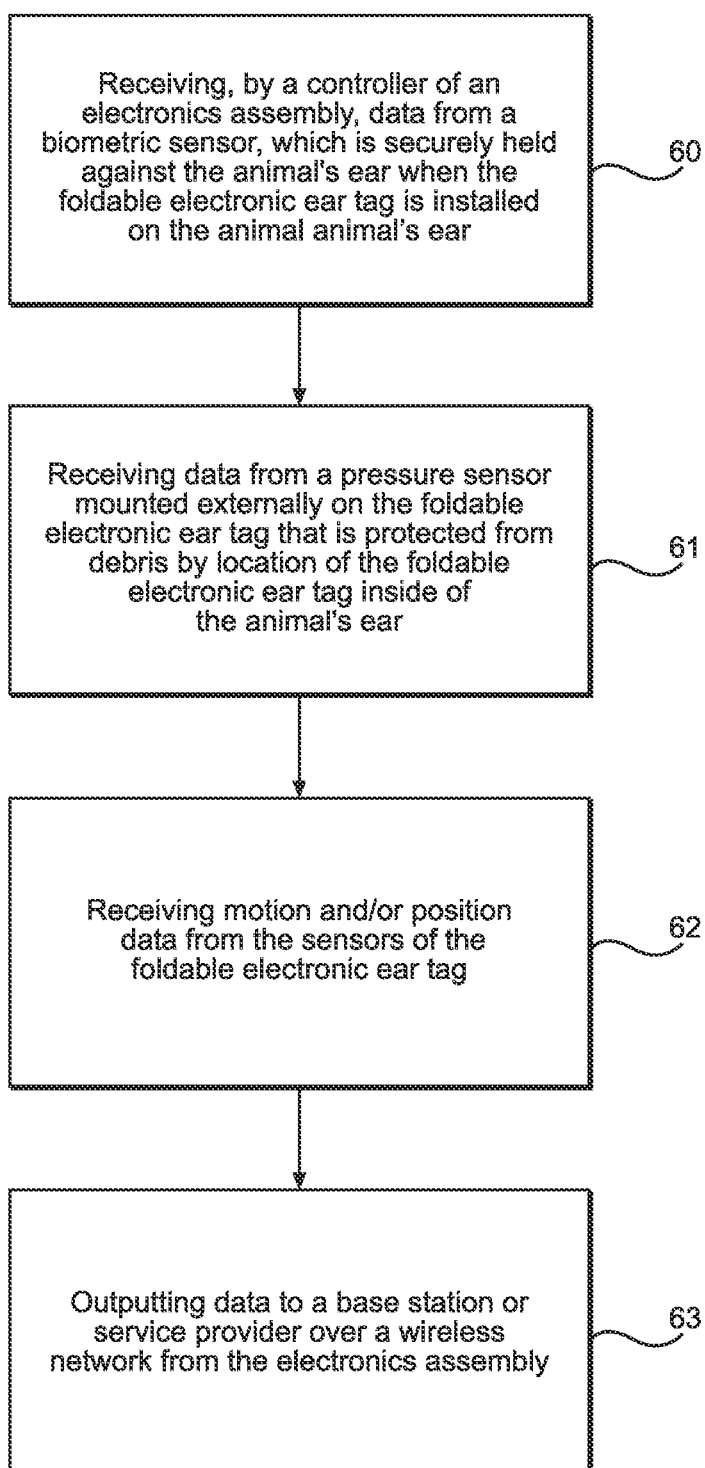

Receiving, by a controller of an electronics assembly, data from a biometric sensor, which is securely held against the animal's ear when the foldable electronic ear tag is installed on the animal animal's ear — 60

Receiving data from a pressure sensor mounted externally on the foldable electronic ear tag that is protected from debris by location of the foldable electronic ear tag inside of the animal's ear — 61

Receiving motion and/or position data from the sensors of the foldable electronic ear tag — 62

Outputting data to a base station or service provider over a wireless network from the electronics assembly — 63

FIG. 6

LIVESTOCK MANAGEMENT SYSTEM

CROSS-REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

The described example embodiments in general relate to a tag, and more specifically, but not by way of limitation, to a tag that can be applied to an animal to track motion and infer behaviors. Embodiments of the tag are structurally configured to place sensing elements advantageously to gather biometric information and receive energy from a photovoltaic cell on the tag.

SUMMARY

One general aspect includes an electronic ear tag for animals. The electronic ear tag also includes a flexible member configured to adapt to an interior of an ear of an animal. The tag also includes a solar panel housed on a protruding segment of the flexible member, where the solar panel is configured to maintain an upward-facing orientation for sunlight exposure when the electronic ear tag is attached to the ear. The tag also includes an electronics assembly mounted on a rigid member of the electronic ear tag, the electronics assembly May include a controller having a processor and memory for receiving and processing data from a location sensor, and a biometric sensor that is in contact with the ear. The tag also includes a strap extending from the flexible member, the strap being configured to fit over the top of the ear to prevent rotation of the electronic ear tag when a securement member is inserted through the strap, the ear, and the flexible member. Other embodiments of this aspect include corresponding computer systems, apparatus, and computer programs recorded on one or more computer storage devices, each configured to perform the actions of the methods.

Implementations may include one or more of the following features. The electronic ear tag where the rigid member has a housing that holds the tag against the ear. The solar panel is mounted on a terminal end of the flexible member to reduce the likelihood of snags or damage. The controller is configured to process data from a pressure sensor (or any kind of biometric sensor or motion monitoring sensor) mounted externally on the flexible member (could also be mounted in other locations on the tag, flexible or rigid). A pin is configured to pass through a top of the ear, providing a rigid and ergonomic mounting location for the electronics assembly. The strap is configured to support the solar panel and prevent the controller from rotating. The controller collects at least one biometric parameter from the biometric sensor, where the at least one biometric parameter includes one or more of heart rate, temperature, oxygen level, blood oximetry, blood pressure, and/or respiration. The controller is configured to output data to a base station or service provider over a wireless network that includes the at least one biometric parameter. The strap is a flexible strap having an attachment point proximate the solar panel. The electronics assembly is located underneath an inside of the ear when the electronic ear tag is secured to the ear of the animal. Implementations of the described techniques may include hardware, a method or process, or computer software on a computer-accessible medium.

One general aspect includes a method for monitoring an animal using a foldable electronic ear tag. The method also includes providing the foldable electronic ear tag. The method also includes conforming the foldable electronic ear tag to an interior of an animal's ear. The method also includes positioning a solar panel on a protruding segment of the foldable electronic ear tag in an upward-facing orientation for optimum sunlight exposure. The method also includes positioning an electronics assembly of the foldable electronic ear tag inside the animal's ear. The method also includes securing the foldable electronic ear tag to the animal's ear using a strap integrated with a pin, the strap configured to fit over a top of the animal's ear to support the solar panel and to prevent rotation of the electronics assembly. Other embodiments of this aspect include corresponding computer systems, apparatus, and computer programs recorded on one or more computer storage devices, each configured to perform the actions of the methods.

Implementations may include one or more of the following features. The method may include receiving, by an electronics assembly, sensor data from one or more sensors of the foldable electronic ear tag, A controller of the electronics assembly receives data from a biometric sensor, which is securely held against the animal's ear when the foldable electronic ear tag is installed on the animal's ear. The securement feature of the tag is enabled by the inherent resiliency of the material used to manufacture the tag. That is, the tag material ensures that the body attempts to extend into the flat position after being folded for installation.

The controller receives data from a pressure sensor mounted externally on the foldable electronic ear tag that is protected from debris by location of the foldable electronic ear tag inside of the animal's ear. In some embodiments, the pressure sensor could be mounted internally. For example, the pressure sensor could be associated with a membrane vent, breather vent, aperture, or other similar element. The method may include passing the pin through the top of the animal's ear to provide a rigid and ergonomic mounting configuration for the electronics assembly. The method may include supporting the solar panel and preventing the electronics assembly from rotating using the strap. The method may include collecting at least one biometric parameter including one or more of heart rate, temperature, oxygen level, blood oximetry, blood pressure, and/or respiration. The method may include ensuring close proximity to between the electronics assembly and the skin of the animal's ear. The method may include outputting data to a base station or service provider over a wireless network from the electronics assembly. The electronics assembly outputs the data when the electronics assembly is in wireless communications range to the base station. Implementations of the described techniques may include hardware, a method or process, or computer software on a computer-accessible medium. In some instances, the tag can also connect directly to the service provider via cellular or satellite networks.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

BRIEF DESCRIPTION OF THE DRAWINGS

FIG. 5 is a flowchart of an example method of installation.

FIG. 6 is a flowchart of an example method of use.

DETAILED DESCRIPTION

Figure 1:
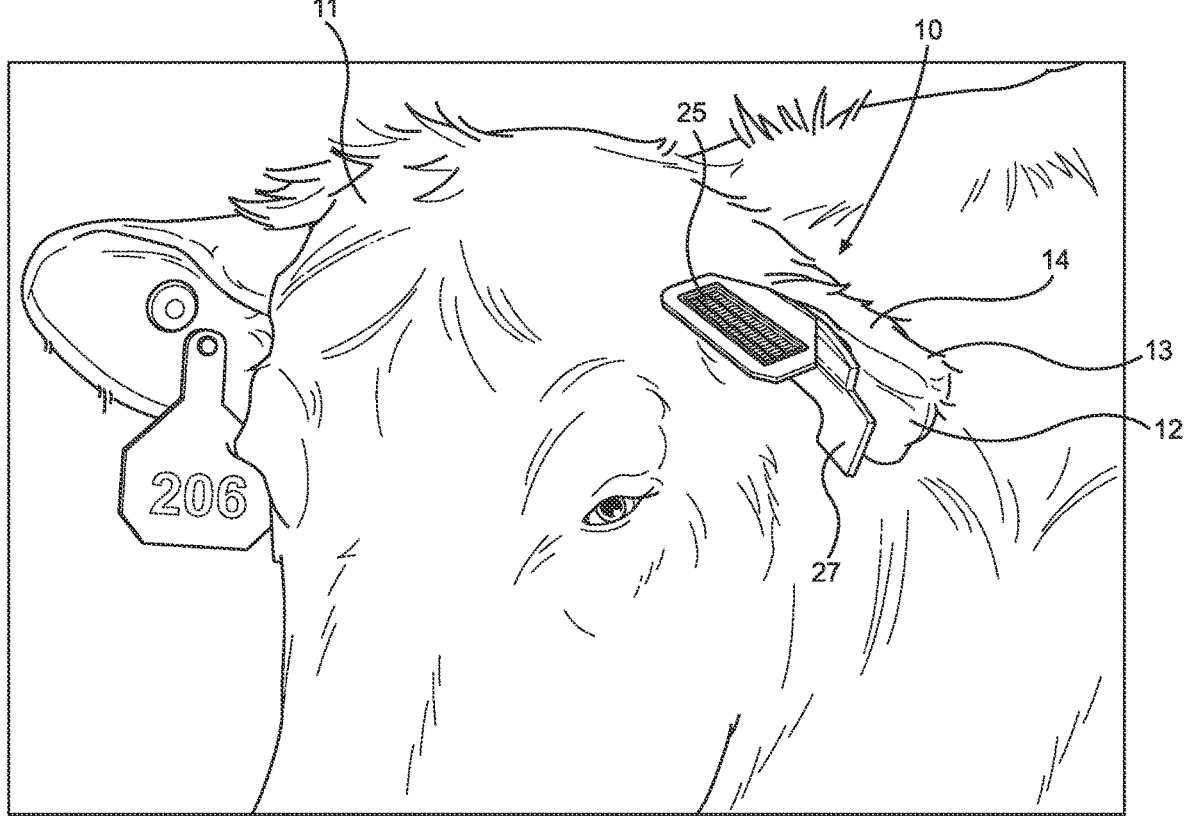
FIG. 1 is a perspective view of a tag in accordance with an example embodiment, mounted on an animal ear.

U.S. Patent Publication No. US-2022-0192152-A1, the entire disclosure of which, except for any definitions, disclaimers, disavowals, and inconsistencies, is incorporated herein by reference. The tag disclosed here can include any of the electronic components disclosed in US-2022-0192152-A1.

A. Overview

Some of the various embodiments of the present disclosure relate to a tag that can be applied to a body part of an animal, such as an ear. The tag can generally include a body that is capable of overlapping an ear of the animal. The tag can include an electronics assembly with a controller (processor and memory), as well as various sensors used to track the motion of the animal, as well as various biometric parameters of the animal.

An example tag of the present disclosure features a foldable/flexible, adaptable design that molds to the interior of the animal's ear. This not only ensures better comfort for the animal but also guarantees that a segment of the assembly protrudes past the periphery of the ear, allowing the integral solar panel to absorb sunlight.

The flexible aspect of the tag provides a unique spring-like quality. This attribute keeps the electronic components of the tag securely against the animal's ear, enabling proximity to the surface/skin for biometric sensing elements and ensuring stability. In addition, the tag is affixed at the top of the animal's ear, a region that tends to be more rigid and durable, thereby enhancing the tag's resilience and lifespan. The flexible aspect of the tag also acts like a shock absorber, helping to reduce the force of impacts on the device.

An example tag may include a support strap that performs a dual function: securing the solar panel and preventing the tag from rotating. This structure ensures that the tag 14 maintains an optimal position and avoids flipping, which could obstruct the solar panel from the sun, thereby affecting its performance.

In some embodiments, the tag has a structure that ensures the safety of its electronic components. The components are situated inside the ear, protecting them from external damage and contributing to the tag's longevity. Another component, the solar element, is extended from the animal's ear on a flexible arm. This placement mitigates the risk of snags or damage and facilitates consistent orientation toward the solar energy source.

The folding and flexible nature of the tag lends itself to a simplified manufacturing process. Moreover, the spring-like quality of the tag helps it load into the animal's ear, providing enhanced stability. Importantly, this design also promotes skin contact (or near skin contact such as when sensors are encased in a housing, the housing would contact the skin), which is beneficial for heart rate sensing and potentially other health monitoring features, such as temperature and oxygen level detection.

The tag features an externally mounted pressure sensor that is located inside the animal's ear, or can utilize an internally mounted pressure sensor with a breather vent or other means of airflow (membrane vent, breather vent, aperture, etc.). This strategic location shields the sensor from debris, ensuring more accurate and usable measurements. This design choice solves the problems encountered by previous models, where sensor placement either within an enclosed housing or externally exposed to debris led to unreliable measurements.

The design of the tag allows for an improved mounting location for the tag, which is the top of the animal's ear, known for its rigidity. Additionally, the tag is pinned not only through the main body of the tag but also through a strap that fits over the top of the ear. This dual-pinning approach offers added support for the solar element while preventing the tag from rotating. This ensures the tag maintains its optimal position for maximum solar exposure and sensor functionality.

B. Exemplary Telecommunications Networks

Some of the embodiments of the present disclosure may be utilized upon any telecommunications network capable of transmitting data including voice data and other types of electronic data. Examples of suitable telecommunications networks for some of the embodiments of the present disclosure include but are not limited to global computer networks (e.g. Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). Some of the example embodiments of the present disclosure may communicate via a single telecommunications network or multiple telecommunications networks concurrently.

Various protocols may be utilized by the electronic devices for communications such as but not limited to HTTP, SMTP, FTP and WAP (wireless Application Protocol). Some of the embodiments of the present disclosure may be implemented upon various wireless networks such as but not limited to 3G, 4G, 5G, LTE, CDPD, CDMA, GSM, PDC, PHS, TDMA, FLEX, REFLEX, IDEN, TETRA, DECT, DATATAC, and MOBITEX. Some of the various example embodiments of the present disclosure may also be utilized with online services and internet service providers.

The Internet is an exemplary telecommunications network for the embodiments of the present disclosure. The Internet is comprised of a global computer network having a plurality of computer systems around the world that are in communication with one another. Via the Internet, the computer systems are able to transmit various types of data between one another. The communications between the computer systems may be accomplished via various methods such as but not limited to wireless, Ethernet, cable, direct connection, telephone lines, and satellite.

C. Central Communication Unit

The central communication unit may be comprised of any central communication site where communications are preferably established with. The central communication units may be comprised of a server computer, cloud-based computer, virtual computer, home computer or other computer system capable of receiving and transmitting data via IP networks and the telecommunication networks. As can be appreciated, a modem or other communication device may be required between each of the central communication units and the corresponding telecommunication networks. The central communication unit May be comprised of any electronic system capable of receiving and transmitting information (e.g., voice data, computer data, etc.).

D. Mobile Device

The mobile device may be comprised of any type of computer for practicing the various aspects of the embodiments of the present disclosure. For example, the mobile device can be a personal computer (e.g., APPLE® based computer, an IBM based computer, or compatible thereof) or tablet computer (e.g., IPAD®). The mobile device may also be comprised of various other electronic devices capable of sending and receiving electronic data including but not limited to smartphones, mobile phones, telephones, personal digital assistants (PDAs), mobile electronic devices, hand-held wireless devices, two-way radios, smart phones, communicators, video viewing units, television units, television receivers, cable television receivers, pagers, communication devices, and digital satellite receiver units.

The mobile device may be comprised of any conventional computer. A conventional computer preferably includes a display screen (or monitor), a printer, a hard disk drive, a network interface, and a keyboard. A conventional computer also includes a microprocessor, a memory bus, random access memory (RAM), read only memory (ROM), a peripheral bus, and a keyboard controller. The microprocessor is a general-purpose digital processor that controls the operation of the computer. The microprocessor can be a single-chip processor or implemented with multiple components. Using instructions retrieved from memory, the 11 microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data. A peripheral bus is used to access the input, output and storage devices used by the computer. In the described embodiments, these devices include a display screen, a printer device, a hard disk drive, and a network interface. A keyboard controller is used to receive input from the keyboard and send decoded symbols for each pressed key to microprocessor over bus. The keyboard is used by a user to input commands and other instructions to the computer system. Other types of user input devices can also be used in conjunction with the embodiments of the present disclosure. For example, pointing devices such as a computer mouse, a track ball, a stylus, or a tablet to manipulate a pointer on a screen of the computer system. The display screen is an output device that displays images of data provided by the microprocessor via the peripheral bus or provided by other components in the computer. The printer device when operating as a printer provides an image on a sheet of paper or a similar surface. The hard disk drive can be utilized to store various types of data. The microprocessor, together with an operating system, operates to execute computer code and produce and use data. The computer code and data may reside on RAM, ROM, or hard disk drive. The computer code and data can also reside on a removable program medium and loaded or installed onto computer system when needed. Removable program mediums include, for example, CD-ROM, PC-CARD, USB drives, floppy disk and magnetic tape. The network interface circuit is utilized to send and receive data over a network connected to other computer systems. An interface card or similar device and appropriate software implemented by microprocessor can be utilized to connect the computer system to an existing network and transfer data according to standard protocols.

E. Example Embodiments

FIG. 1 illustrates an example embodiment of a tag 10 installed on an ear of an animal 11. In this example, the tag 10 is placed so that it conforms to an inner side 12 of the ear 13, allowing a portion of the elements of the tag to remain within the ear and a portion of the tag to protrude past a periphery 14 of the ear 13.

Figure 2A:
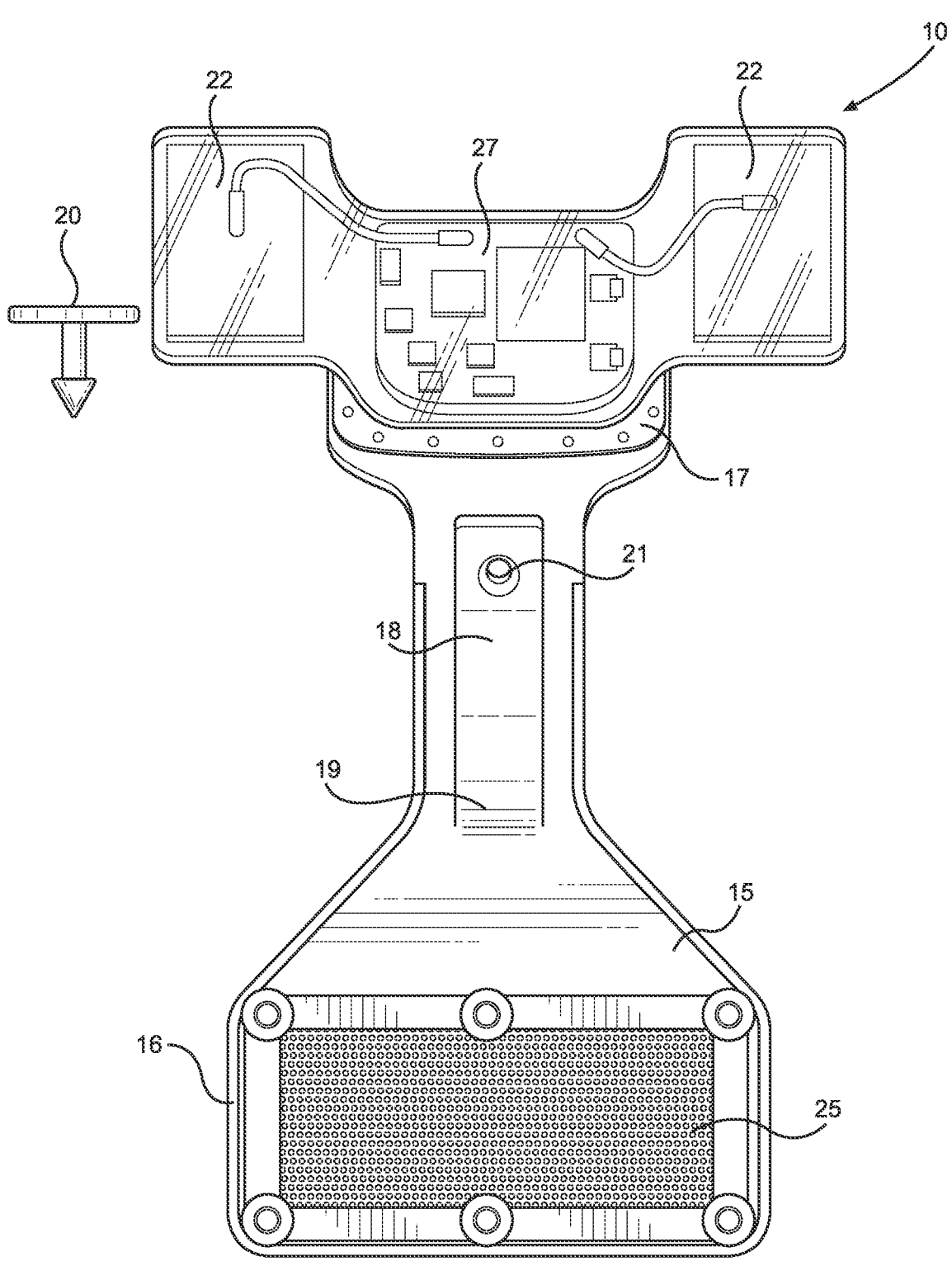
FIG. 2A is a top elevation view of an example flexible, foldable tag.

Referring now to FIG. 2A, which is a top elevation view of the tag 10. The tag 10 includes a first body portion 15 that is made from a flexible, resilient material, such as a plastic or polymer (any flexible/resilient material can be used). However, it should be noted that since this tag 10 may have skin contact, the material used should preferably not react with the animal's skin. The first body portion 15 includes a pad 16 that supports a solar panel. A second body portion 17 can be made from a more rigid material than the first body portion 15. The second body portion 17 supports an electronics assembly, as will be discussed below.

Figure 3:
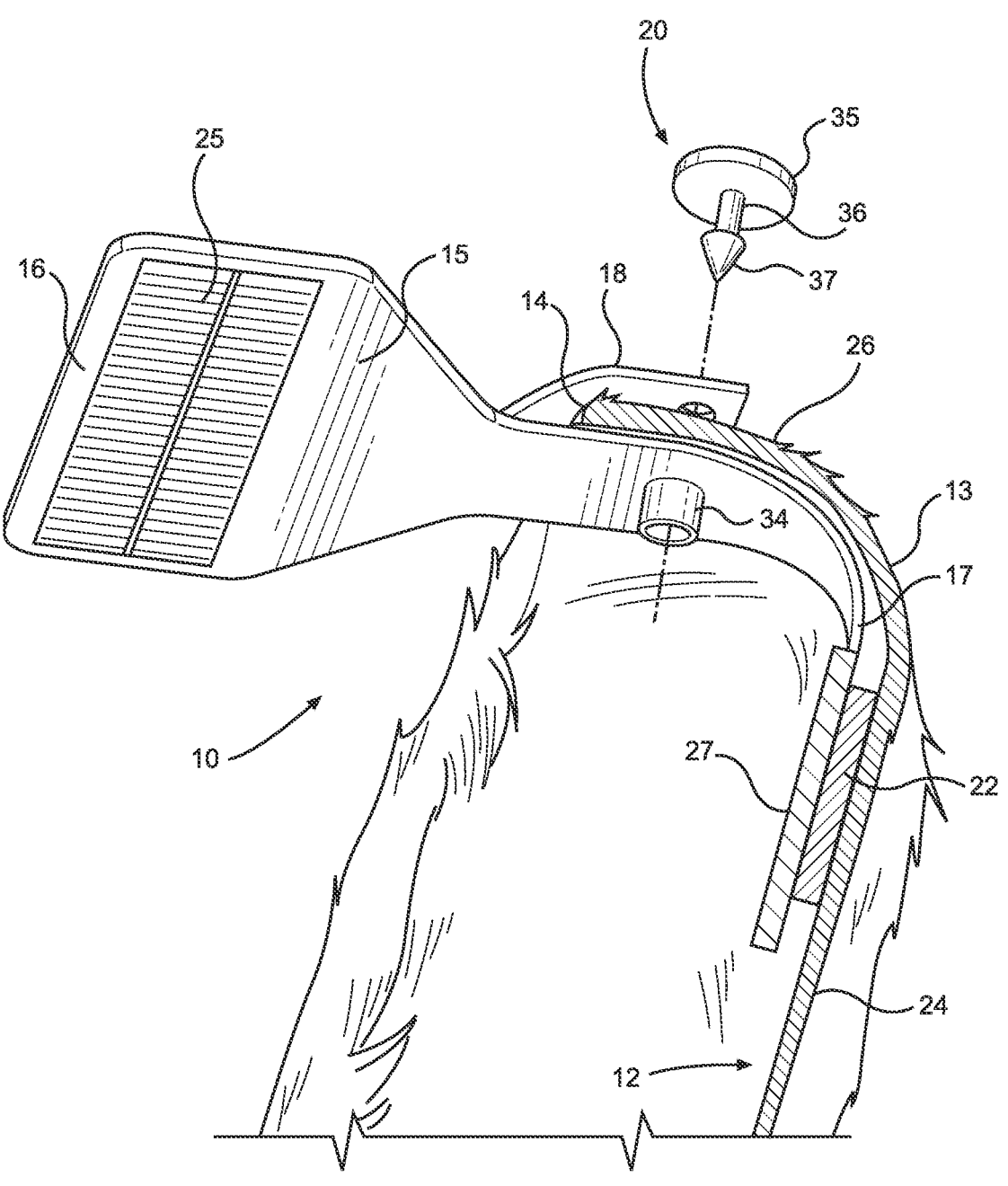
FIG. 3 is a cross-section view of the tag installed on the ear of an animal.

A strap 18 used to secure the tag 10 to the ear of the animal is also made of a flexible material. The strap 18 is biased to extend away from the first body portion 15, with an anchoring point 19 proximately located near the pad 16. The strap 18 can overlap the top of the ear of the animal. A pin 20 is used to secure the strap 18 and the first body portion 15 to the ear. The pin can be inserted through an aperture on a terminal end 21 of the strap 18, passing through the ear, and first body portion 15 of the tag 10. This configuration and installation are best shown in FIG. 3, which is a cross-section of the installation.

Figure 2B:
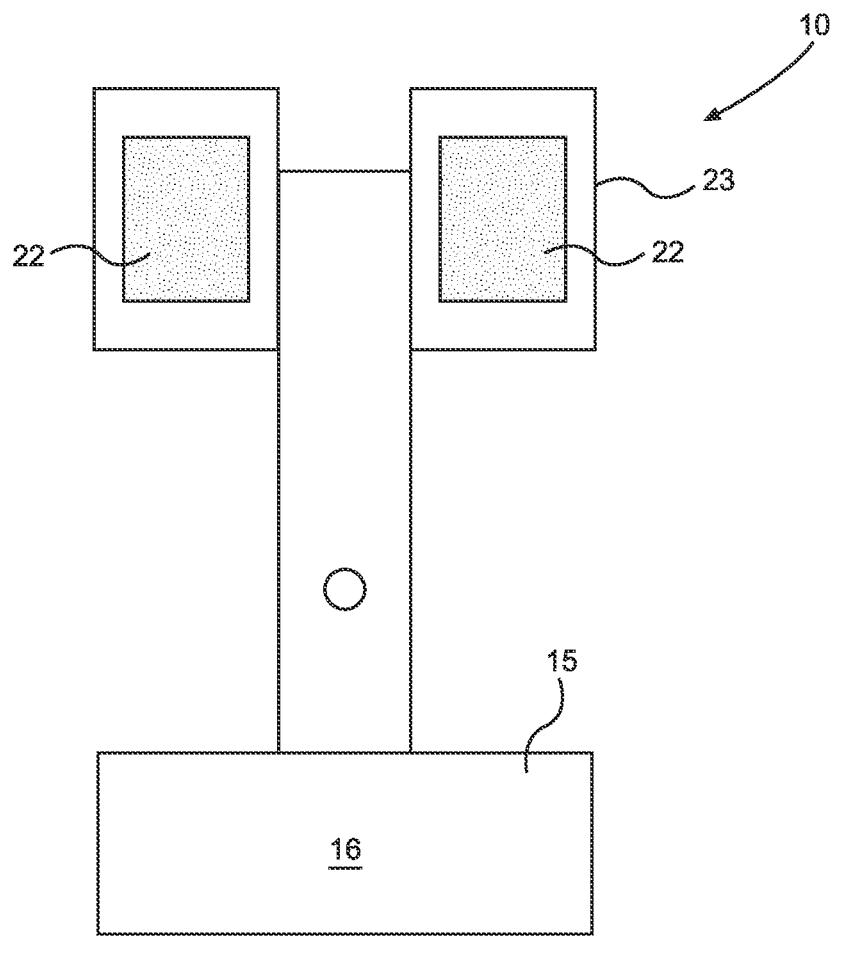
FIG. 2B is a bottom elevation view of an example flexible, foldable tag.

FIG. 2B is a bottom plan view of the tag 10 illustrating antennas 22 that are mounted to a topside 23 of the tag, and specifically the second body portion 17. The antennas can communicate with various sensors such as biometric sensors, motion, location, or any other sensor. Antennas 22 can also be used to transmit data to base stations or other infrastructure.

Figure 2C:
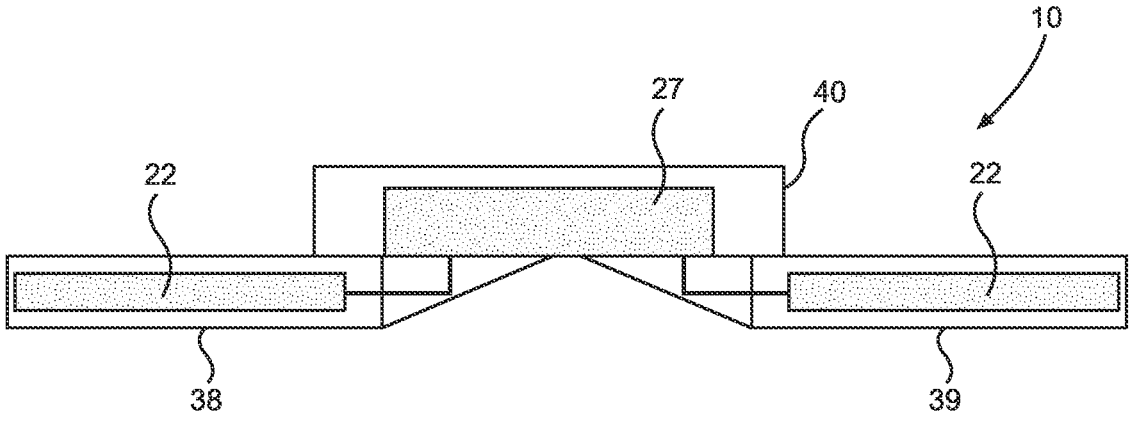
FIG. 2C is a rear elevation view of an example flexible, foldable tag.

In FIG. 2C, a rear elevation view is shown where a housing 40 encloses an electronics assembly 27 of the tag 10. The housing protects the components of the electronics assembly 27 from exposure to environmental elements such as dirt and water. The housing can encompass the antennas 22 as well. In some embodiments, the housing 40 is molded and configured to shape and contour to the electronics assembly 27. Also, as illustrated in FIG. 1, the outside of the tag where the electronics assembly is located can be provided with a reflective material or a visual indicator that includes, for example, a number that uniquely identifies the animal. Other types of indicia can be used, as would be known to one of ordinary skill in the art. To be sure, indicia can be provided on either side. Also, an LED (light emitting diode) or other luminance generating element can be included. The LED could be used to emit a pattern or luminate to help identify the location of the animal, which could be helpful in low-light conditions.

Figure 2D:
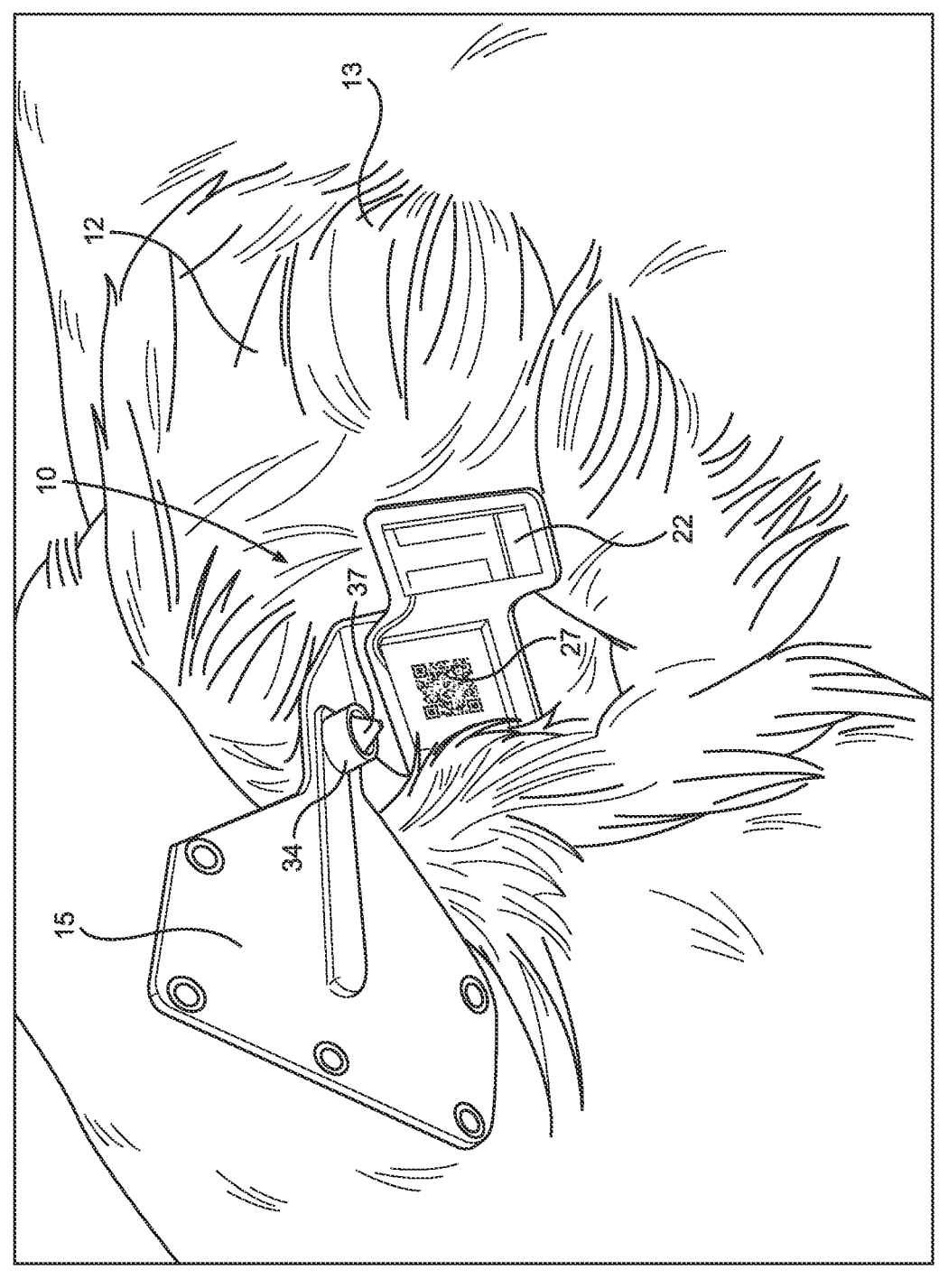
FIG. 2D is a perspective view of the example flexible, foldable tag, installed on an animal.

In some instances, the antennas 22 can be located at feet 38 and 39, with the electronics assembly 27 being spaced at a distance. FIG. 2D illustrates a perspective view of the tag 10 installed on the ear 13.

In FIG. 3 is a cross-section view of the tag installed on the ear of an animal. The tag 10 is joined to the ear 13 in such a way that the second body portion 17 is placed in the inner side 12 of the ear 13. Antennas 22 are used by the controller to communicate data from the tag to a base station. As noted above, the pad 16 and solar panel 25 are located beyond the periphery 14 of the ear 13, extending out on the first body portion 15. As noted, this orientation allows for the solar panel 25 to be located in an upward-facing orientation so that sun exposure is maximized.

The strap 18 overlaps the periphery 14 and overlays a topside 26 of the ear 13. The pin 20 is inserted through the strap 18, ear 13, and first body portion 15. In some instances, the first body portion 15 includes a cylindrical, hollow post 34 that receives the pin 20. The pin 20 can be configured with a flat top 35, a shaft 36 and a barb 37. The barb 37 is pointed and configured to pierce the hard cartilage of the ear. The barb 37 is conical in shape to extend through the cylindrical, hollow post 34 so that the barb 37 locks the tag in place. While a barb-type pin has been disclosed, other fastening means can be used. Referring back to FIG. 2D, the barb 37 is shown extending through the cylindrical, hollow post 34.

An electronics assembly 27 is located inside the ear 13 on the underside of the second body portion 17. As noted, the location of the electronics assembly 27 protects the electronics assembly 27 from incidental damage that might occur if the electronics assembly were located externally and not covered by a body part, such as an ear or ear flap.

Figure 4:
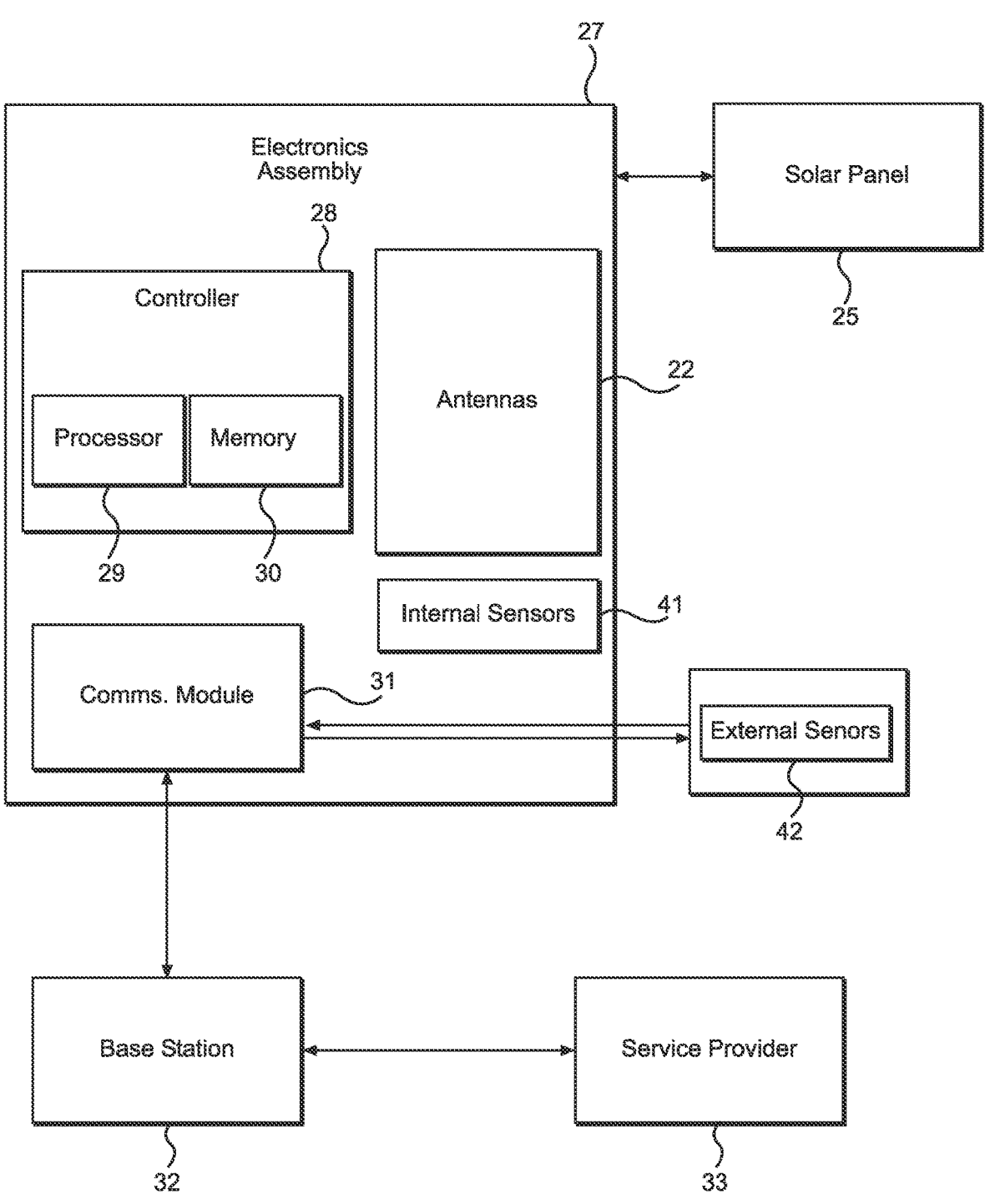
FIG. 4 is a schematic view of the tag, including the electronics assembly, as well as other network elements used by the tag to offload data.

FIG. 4 is a schematic view of the tag, including the electronics assembly, as well as other network elements used by the tag to offload data. The solar panel 25 is electrically coupled to the electronics assembly 27 via an electronic trace or wire. Energy that is gathered by the photovoltaic cell is gathered and stored in an energy storage device of the electronics assembly 27. The gathered energy can also directly power the electronics assembly 27.

The electronics assembly 27 can include a controller 28 having a processor 29 and memory 30 for storing instructions and data gathered by the controller 28. The processor 29 executes instructions stored in memory 30 to perform various actions and methods. One such method relates to obtaining of biometric data from the internal 41 or external sensors 42. The sensors can include any one or more of biometric sensors such as temperature, oxygen level, blood oximetry, blood pressure, respiration, and the like. One example of internal sensors or on-board sensors includes a heartrate monitor. Another on-board sensor would include a pressure sensor that incorporates a membrane vent, breather vent, aperture or other similar structure with an equivalent function.

External sensors 42 can also include motion, acceleration, and/or position sensors that detect movement, orientation, and location of the animal over time or at specific times. Some sensors are positioned on the animal's head (on the ear), the movement of the tag is indicative of both the movement of the animal's head as well as the movement of the animal in general. Some external sensors may not be located on the ear or head of the animal. External sensors 42 may be physically separate from the tag.

The electronics assembly 27 can include a communications module 31 that allows the controller 28 to transmit and/or receive data over a network, using any short- or long-range wireless protocol (leveraging the antennas 22). For example, the controller 28 can transmit sensor data collected from the sensors to a base station 32 located in a paddock or a confinement area using the antennas 22. The controller 28 can offload sensor data to the base station 32 when the controller 28 is in the communication range of the base station. The base station 32 can be configured to process the sensor data locally or forward the data to a service provider 33 for processing. As noted above, the tag can also connect directly to the service provider via cellular or satellite communication networks.

Figure 7:
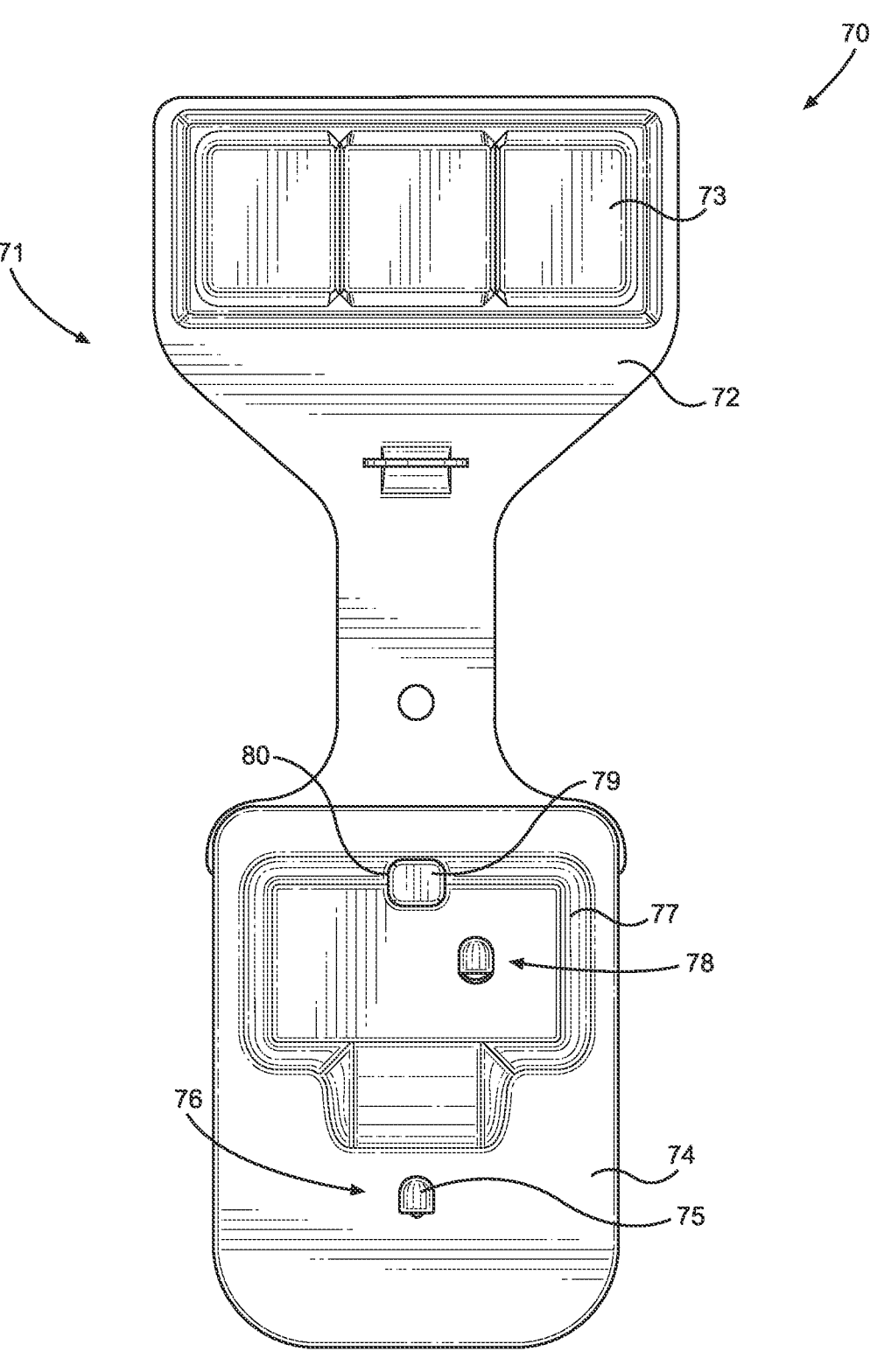
FIG. 7 is a perspective view of another example ear tag.

FIG. 7 is a perspective view of another example tag. The tag 70 can include a streamlined body 71 that includes a first end 72 and the photovoltaic cell (solar panel) 73 can be mounted thereon. Instead of having second end 74 with a winged shape (e.g., feet) that receive sensors or antennas as with the embodiments above, the tag provides two example locations for a pressure sensor 75. One location 76 is below a housing 77 for the electronics of the tag. Another location 78 is on the housing or integrated with the housing 77. A heartrate sensor 79 can likewise be mounted on the housing 77. The heartrate sensor 79 can be mounted in a protrusion 80 of the housing 77 so that skin contact is maximized.

F. Operation of Example Embodiment

Referring now to the collective drawings, the installation process of an example electronic ear tag is designed to be simple and efficient, ensuring the comfort of the animal and ease for the operator. Firstly, the foldable tag is gently opened, and the solar panel is oriented and ensured to be in a proper upward-facing configuration for optimum sunlight exposure. Because the solar panel is mounted on a first body portion 15 the solar panel can extend past a periphery of the ear.

The system's flexibility enables the assembly to comfortably adapt to the interior shape of an animal's ear while positioning the second body portion 17 inside the ear. This adaption not only provides comfort to the animal but also ensures that the ear tag remains securely in place even during the animal's vigorous movements. The electronics assembly is mounted to the second body portion 17 and is thus located inside the animal's ear.

Next, the strap is maneuvered over the top part of the animal's ear. A barbed pin is then inserted through the more rigid, upper part of the animal's ear. This location is chosen not only for its durability but also to provide a stable base for the tag, preventing it from rotating or flipping. The barbed pin locks the tag in place on the ear.

The electronics assembly is securely housed on the foldable assembly, safely tucked inside the animal's ear. The electronics assembly receives data from the electronic components of the system, such as motion, location, biometric, and/or pressure sensors 75. Some of these sensors are mounted externally on the assembly but are protected from debris by their strategic location inside the animal's ear.

The tag also has a skin contact feature that allows the controller to collect and process data, such as heart rate and is configured for sensing technologies like temperature and oxygen levels. These capabilities make the tag not just a device for identification, but also an essential tool for health monitoring and animal well-being.

Overall, the installation process is designed to ensure minimal discomfort to the animal while optimizing the functionality and stability of the ear tag system. With its advanced features and flexible design, this system provides a new and improved method for animal tagging and monitoring.

FIG. 5 is a flowchart of an example method of installation and use. The method includes a step 50 of providing the foldable electronic ear tag, as well as a step 51 of conforming the foldable electronic ear tag to an interior of an animal's ear. Once the tag is in place, the method includes a step 52 of positioning a solar panel on a protruding segment of the foldable electronic ear tag in an upward-facing orientation for optimum sunlight exposure. This can include ensuring that the solar panel extends beyond a periphery of the ear. The installation also includes the step 53 of positioning an electronics assembly of the foldable electronic ear tag inside the animal's ear. In some embodiments, the method includes a step 54 of securing the foldable electronic ear tag to the animal's ear using a strap integrated with a pin, the strap configured to fit over a top of the animal's ear to support the solar panel and to prevent rotation of the electronics assembly. The pin is inserted through the strap, the ear, and the body of the tag to secure the foldable electronic ear tag to the animal.

FIG. 6 is a method for using the foldable electronic ear tag after installation. The method includes a step 60 of receiving, by a controller of an electronics assembly, data from a biometric sensor, which is securely held against the animal's ear when the foldable electronic ear tag is installed on the animal's ear. The biometric sensor data can include at least one biometric parameter such as heart rate, temperature, oxygen level, blood oximetry, blood pressure, and/or respiration, as well as other biometric parameters that may infer or indicate a health level of the animal.

The method also optionally includes a step 61 of receiving data from a pressure sensor mounted externally on the foldable electronic ear tag that is protected from debris by location of the foldable electronic ear tag inside of the animal's ear. The method can also include a step 62 of receiving motion and/or position data from the sensors of the foldable electronic ear tag. The method can include a step 63 of outputting data to a base station or service provider over a wireless network from the electronics assembly. The electronics assembly, and specifically the controller, outputs the data when the electronics assembly is in wireless communications range to the base station. In some instances, these communications can be direct.

Any and all headings are for convenience only and have no limiting effect. Unless 9 otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, the computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the present disclosure will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the embodiments in the present disclosure, suitable methods and materials are described above. Thus, the present disclosure is not intended to be limited to the embodiments shown, but is to be accorded the widest scope consistent with the principles and features disclosed herein.

While various embodiments have been described above, it should be understood that they have been presented by way of example only, and not limitation. The descriptions are not intended to limit the scope of the technology to the particular forms set forth herein. To the contrary, the present descriptions are intended to cover such alternatives, modifications, and equivalents as may be included within the spirit and scope of the technology as defined by the appended claims and otherwise appreciated by one of ordinary skill in the art. The various embodiments of the present disclosure may be embodied in other specific forms without departing from the spirit or essential attributes thereof, and it is therefore desired that the various embodiments in the present disclosure be considered in all respects as illustrative and not restrictive. Thus, the breadth and scope of a preferred embodiment should not be limited by any of the above-described exemplary embodiments.

Unless otherwise defined, all technical and scientific terms used herein have the same meaning as commonly understood by one of ordinary skill in the art to which this invention belongs. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. Any headings utilized within the description are for convenience only and have no legal or limiting effect.

What is claimed is:

1. An electronic ear tag for animals, comprising:
   a flexible member configured to adapt to an interior of an ear of an animal, wherein the flexible member includes a protruding segment that extends past a perimeter of the ear to present a skyward-facing surface and an opposing groundward-facing surface;
   a solar panel housed atop the skyward-facing surface of the protruding segment of the flexible member;
   an electronics assembly mounted on a rigid member of the electronic ear tag, the electronics assembly comprising a controller having a processor and memory for receiving and processing data from a location sensor, and a biometric sensor that are in contact with the ear; and
   a strap extending from the flexible member, the strap being configured to fit over a top of the ear to prevent rotation of the electronic ear tag and maintain the solar panel in a skyward orientation atop the skyward-facing surface of the protruding segment of the flexible member when a securement member is inserted through the strap, the ear, and the flexible member.

2. The electronic ear tag of claim 1, wherein the rigid member has a housing that holds the electronics assembly securely against the ear.

3. The electronic ear tag of claim 1, wherein the solar panel is mounted on a terminal end of the flexible member to reduce the likelihood of snags or damage.

4. The electronic ear tag of claim 1, wherein the controller is configured to process data from a pressure sensor mounted externally on the rigid member.

5. The electronic ear tag of claim 1, wherein a pin is configured to pass through a top of the ear, providing a rigid and ergonomic mounting location for the electronics assembly.

6. The electronic ear tag of claim 1, wherein the strap is configured to support the solar panel and prevent the controller from rotating.

7. The electronic ear tag of claim 1, wherein the controller collects at least one biometric parameter from the biometric sensor, wherein the at least one biometric parameter includes one or more of heart rate, temperature, oxygen level, blood oximetry, blood pressure, and/or respiration.

8. The electronic ear tag of claim 7, wherein the controller is configured to output data to a base station or service provider over a wireless network that includes the at least one biometric parameter.

9. The electronic ear tag of claim 1, wherein the strap is a flexible strap having an attachment point proximate the solar panel.

10. The electronic ear tag of claim 1, wherein the electronics assembly is located underneath an inside of the ear when the electronic ear tag is secured to the ear of the animal.

* * * * *